July 31, 1928.
W. C. STARKEY
REBOUND DAMPER
Filed June 6, 1925
1,679,179
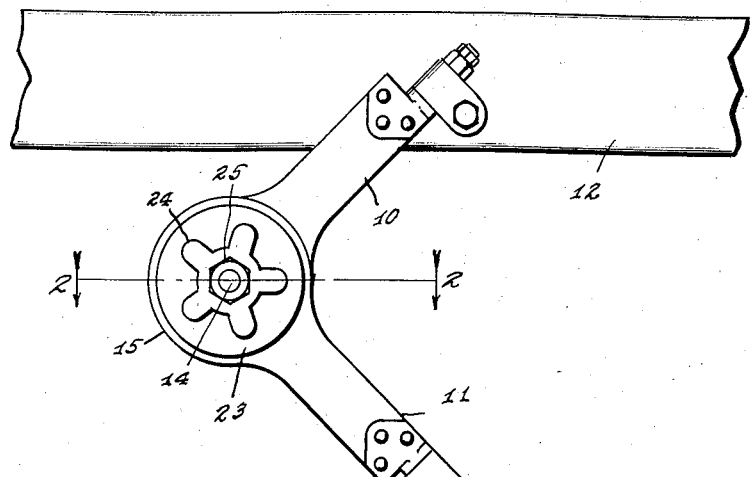
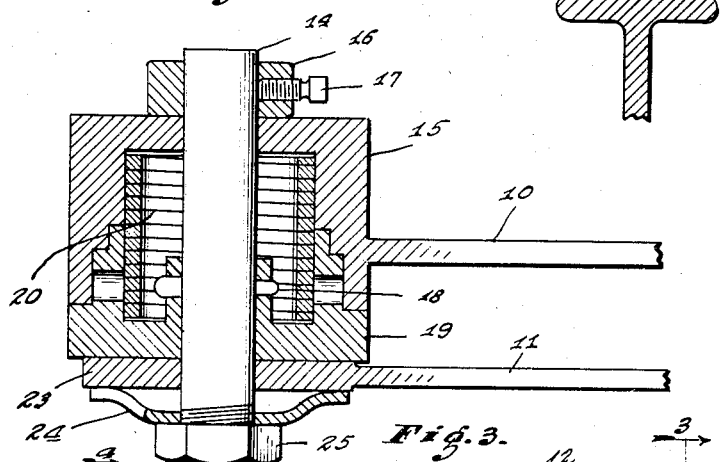
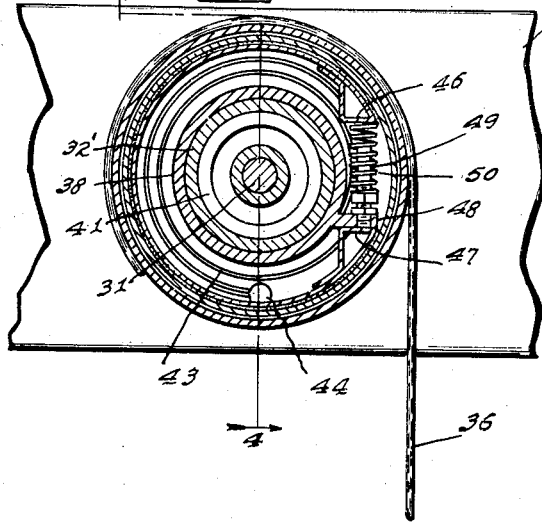
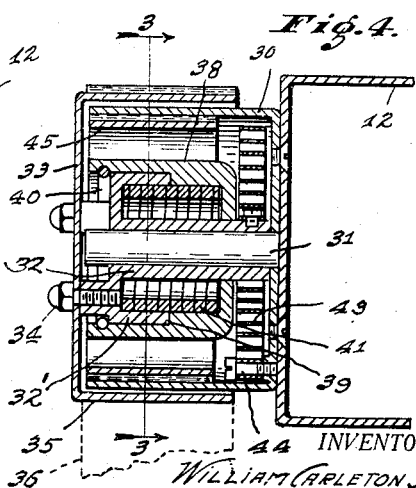
INVENTOR.
WILLIAM CARLETON STARKEY,
BY
ATTORNEY.

Patented July 31, 1928.

1,679,179

UNITED STATES PATENT OFFICE.

WILLIAM CARLETON STARKEY, OF INDIANAPOLIS, INDIANA, ASSIGNOR TO L. G. S. DEVICES CORPORATION, OF INDIANAPOLIS, INDIANA, A CORPORATION OF INDIANA.

REBOUND DAMPER.

Application filed June 6, 1925. Serial No. 35,281.

It is the object of my invention to produce a rebound check adapted to be attached to automobiles and to supplement the action of the customary automobile springs by applying a frictional check to the separation of the automobile frame and axle upon rebound. A further object of my invention is to produce such a device in which the frictional drag is imparted under all circumstances immediately upon the beginning of rebound.

I accomplish the above objects by providing a friction brake between the automobile frame and axle, which friction brake will operate to exert a retarding force opposing the separation of automobile frame and axle but will permit free relative movement of these parts toward each other. More specifically, I provide two members connected respectively to the automobile frame and the axle and connected together through a clutch which will permit the two members to move relatively without restraint in one direction and which will impose a frictional resistance to movement of the two members in the opposite direction.

The accompanying drawing illustrates two devices embodying my invention:—Fig. 1 is an elevation of a device embodying my invention in position on an automobile; Fig. 2 is a section on the line 2—2 of Fig. 1; Fig. 3 is a section on the line 3—3 of Fig. 4 showing another embodiment of my invention; and Fig. 4 is a vertical section on the line 4—4 of Fig. 3.

In the device shown in Figs. 1 and 2, two arms 10 and 11 are pivotally connected respectively to the automobile frame 12 and the automobile axle 13 and are pivotally connected together about the axis of a short shaft 14. A member 15 is rigidly connected to the arm 10 and is rotatable on the shaft 14, being prevented from axial movement relative to such shaft by means of a collar 16 attached to the shaft by suitable means such as the set screw 17.

Rigidly connected to the shaft 14 as by means of a tapered pin 18 is a friction brake member 19. The members 15 and 19 are provided with alined central cylindrical recesses within which is mounted a coil-spring 20. This spring when not subjected to any stress is slightly larger in external diameter than the recesses in the members 15 and 19 so that when in place it bears against the cylindrical walls of these recesses. Preferably, the recess in the member 15 is shouldered in order that the member 19 may extend within it, thus forming a dust-proof joint between these two members and at the same time providing a continuous cylindrical surface against which the exterior of the coil-spring bears.

Rotatably mounted on the shaft 14 in position to bear against the face of the friction brake member 19 is a second friction brake member 23 which is rigidly connected to the arm 11. The brake member 23 is held against the face of the member 19 by some yielding means such as the star spring 24, the pressure exerted by the star spring being adjustable by means of a nut 25 screw threadedly mounted on the shaft 14.

In operation, when the automobile axle moves toward the frame, the outer ends of the two arms 10 and 11 approach each other, the two arms rotating relatively about the axis of the shaft 14. As the member 15 is rigid with the arm 12 and as the two friction brake members 19 and 23 are in engagement the two members 15 and 19 rotate relatively to each other. This rotation is in a direction tending to wind the spring 20, thus causing a reduction in the diameter of the spring. Under these conditions, the spring tends to recede from the walls of the recesses in the members 15 and 19 and to permit free relative rotation of the member in this direction. Under rebound, when the frame 12 and axle 13 move away from each other, the two members 15 and 19 rotate relatively to each other in a direction tending to unwind the spring 20. This tendency to unwind causes the coil-spring to expand, and the turns of the coil spring are thus firmly forced against the wall of the recesses in the members 15 and 19 with the result that these two members cannot rotate relatively to each other. With the member 19 locked to the member 15 by the action of the spring, separation of the frame 12 and the axle 13 causes relative rotation between the two friction brake members 19 and 23. The friction between these two members acting as a restraining force limiting the rebound or separation of automobile axle and frame.

In the device illustrated in Figs. 3 and 4, a cup-shaped casing 30 bearing a stud shaft 31 is mounted on the frame 12 of an automobile. Rotatably mounted on this shaft is a member 32 to the outer end of which is attached a drum 33 as by means of screws 34. The drum 33 includes an annular flange 35 around which is wrapped a strap 36, the inner end of the strap 36 being attached to the drum by any suitable means. The other end of the strap is adapted to be affixed to the axle 13 of the automobile.

Rotatably mounted on the member 32 is a member 38 which is provided with a central circular recess. This recess is shouldered as at 39 in order that it may receive an annular flange 32' integral with the member 32. The member 38 extends outwardly beyond the outer face of the member 32 and is provided with an annular groove, semicircular in cross-section, for the reception of a split, spring ring 40 which bears against the outer face of the member 32 and prevents axial movement between the two members. Located within the recess in the member 38 and extending into the recess formed by the annular flange 32' is a coil spring 41, the normal diameter of which is slightly larger than that of the recesses in the members 32 and 38 so that the spring bears against the walls of these recesses.

The outer end of a coil spring 43 is attached to the casing 30 as by means of a screw 44. The inner end of the spring 43 is affixed to the inwardly extending hub of the member 32, the spring tending to rotate the member 32 and the drum 33 in a direction to wind the strap 36 around the drum.

Mounted within the casing 30 is a brake shoe 45 adapted to bear against the inner wall of such casing. The ends of the brake shoe 45 are provided with opposed abutments 46 and 47, one of which (the abutment 47 as shown in the drawings) engages an outwardly extending arm 48 rigid with the member 38. Mounted in the arm 48 and extending toward the abutment 46 is a screw-threaded rod 49 which supports a spring 50 operating between the abutment 46 and a nut 51 mounted on the rod 49. The nut 51 may be adjusted to vary the pressure exerted by the brake shoe on the inner wall of the casing 30.

Under rebound, the frame 12 and axle 13 separate, thus tending to unwind the strap 36 from the drum 33. Such unwinding causes a rotation of the drum in a clockwise direction (Fig. 3), this rotation being imparted to the member 32 which is rigid with the drum. The coil-spring 41 is wound in such a direction that when the member 32 rotates as the strap 36 is unwound the spring tends to unwind. This tendency to unwind causes the spring to tend to increase in diameter, thus forcing it firmly against the walls of the recesses within which it is located. This action of the spring as it tends to unwind firmly locks together the members 32 and 38, so that the rotation of the member 32 is imparted to the member 38. As the arm 48 bears against the abutment 47 of the brake shoe, the brake shoe is forced to rotate, the friction between it and the casing 30 tending to prevent rotation of the drum 33, thus damping the rebound.

When the automobile frame and axle return to their normal relative position, the spring 43 causes the drum 33 to rotate and keep the strap 36 taut. Rotation of the drum 33 and member 32 in this direction is freely permitted by the coil spring, for rotation in this direction tends to wind the coil spring and reduce it in diameter thus freeing it from the walls of its associated recesses and permitting free relative rotation of the members 32 and 38.

In both modifications of my device illustrated, the coil spring clutch operates under rebound to impart a frictional resistance to the separation of the automobile frame and axle. This frictional resistance is imposed immediately upon the commencement of rebound, for no appreciable relative rotation of the spring-containing members is necessary to lock those two members together when they tend to rotate in a direction to unwind the spring.

I claim as my invention:—

1. A rebound check for automobiles, comprising two friction brake members, a third member rotatable relatively to said brake members, means for connecting said third member and one of said brake members respectively with two parts of an automobile which separate on rebound whereby said brake member and said third member will rotate relatively to each other when said two automobile parts move relatively to each other, that one of said brake members not connected to an automobile part being provided with a central circular recess, and a coil spring located within said recess and bearing against the wall thereof, said coil spring being operatively connected to said third member so that when said third member and said recessed member tend to rotate on rebound in a direction to unwind said spring said spring will expand and lock said two members together.

2. A rebound check as set forth in claim 1 with the addition that said third member is provided with a central circular recess into which said spring extends, said spring bearing against the wall of said recess in said third member.

In witness whereof, I have hereunto set my hand at Indianapolis, Indiana, this 4th day of June, A. D. one thousand nine hundred and twenty-five.

WILLIAM CARLETON STARKEY.